(12) United States Patent
Bullock

(10) Patent No.: US 8,823,387 B1
(45) Date of Patent: Sep. 2, 2014

(54) BLOWN FUSE DETECTOR

(75) Inventor: Scott A. Bullock, Bristol, VA (US)

(73) Assignee: Electro-Mechanical Corporation, Bristol, VA (US)

( * ) Notice: Subject to any disclaimer, the term of this patent is extended or adjusted under 35 U.S.C. 154(b) by 351 days.

(21) Appl. No.: 13/416,273

(22) Filed: Mar. 9, 2012

Related U.S. Application Data

(60) Provisional application No. 61/451,830, filed on Mar. 11, 2011.

(51) Int. Cl.
*H01H 85/30* (2006.01)
*G01R 31/02* (2006.01)
*H01H 85/32* (2006.01)

(52) U.S. Cl.
CPC .............. *H01H 85/32* (2013.01); *H01H 85/30* (2013.01)
USPC ........................................................ 324/550

(58) Field of Classification Search
CPC ................................ H01H 85/30; H01H 85/32
See application file for complete search history.

(56) References Cited

U.S. PATENT DOCUMENTS

| | | | |
|---|---|---|---|
| 4,148,024 A * | 4/1979 | Kuhn et al. | 340/638 |
| 4,263,589 A | 4/1981 | Lewiner et al. | |
| 4,616,207 A * | 10/1986 | Knapp et al. | 338/32 H |
| 4,691,197 A | 9/1987 | Damiano et al. | |
| 5,233,330 A | 8/1993 | Hase | |
| 5,973,418 A | 10/1999 | Ciesielka et al. | |
| 6,624,638 B2 | 9/2003 | St-Germain | |
| 6,696,969 B2 | 2/2004 | Torrez et al. | |
| 6,853,289 B2 | 2/2005 | Scoggin | |
| 7,369,029 B2 | 5/2008 | Ackermann | |
| 7,561,017 B2 | 7/2009 | Darr et al. | |
| 7,855,873 B2 | 12/2010 | Darr et al. | |
| 8,294,477 B2 | 10/2012 | Handshoe et al. | |
| 8,395,397 B1 | 3/2013 | Handshoe et al. | |
| 2005/0212527 A1 * | 9/2005 | Wu | 324/550 |
| 2008/0048819 A1 | 2/2008 | Darr | |

FOREIGN PATENT DOCUMENTS

| | | |
|---|---|---|
| EP | 0570310 A1 | 11/1993 |
| GB | 2074406 A | 10/1981 |
| WO | 93/12436 A1 | 6/1993 |
| WO | 99/05761 A1 | 2/1999 |
| WO | 2006/031792 A2 | 3/2006 |

* cited by examiner

*Primary Examiner* — Jermele M Hollington
(74) *Attorney, Agent, or Firm* — The Van Winkle Law Firm; Steven C. Schnedler

(57) ABSTRACT

A blown fuse detector of the general type which monitors voltage drop across a fuse. Embodiments of the invention in particular are applicable to medium voltage AC fuse circuits, operating within the approximate voltage range 2,400 to 38,000 volts. The blown-fuse detector includes first and second electrical connection structures for electrically connecting the first and second conductor portions to the first and second fuse terminals, respectively. A voltage differential detector circuit has first and second differential inputs and is operable to generate a detector output when the voltage across the differential inputs exceeds a predetermined of threshold voltage. First and second capacitors capacitively couple the first and second electrical connection structures to the first and second differential inputs, respectively, the capacitors serving as capacitively-coupled voltage sensors.

7 Claims, 3 Drawing Sheets

US 8,823,387 B1

BLOWN FUSE DETECTOR

CROSS-REFERENCE TO RELATED APPLICATION

The benefit of U.S. provisional patent application Ser. No. 61/451,830, filed Mar. 11, 2011, and titled "Blown Fuse Detector" is claimed, the entire disclosure of which is hereby expressly incorporated by reference.

BACKGROUND OF THE INVENTION

The invention relates to blown fuse detectors of the general type which monitor the voltage across a fuse, and provide a remote indication that the fuse has "blown" when the monitored voltage exceeds the small voltage drop across the fuse which occurs during normal operation when the fuse is intact. Embodiments of the invention in particular are applicable to medium voltage AC fuse circuits, operating within the approximate voltage range 2,400 to 38,000 volts.

SUMMARY OF THE INVENTION

In one aspect, a detector for monitoring voltage drop across a fuse for blown-fuse detection is provided. The fuse has first and second fuse terminals and protects a circuit having first and second conductor portions, the fuse being electrically connected in series with the first and second conductor portions. The blown-fuse detector includes first and second electrical connection structures for electrically connecting the first and second conductor portions to the first and second fuse terminals, respectively; a voltage differential detector having first and second differential inputs and which is operable to generate a detector output when the voltage across the differential inputs exceeds a predetermined threshold voltage; and first and second capacitors capacitively coupling the first and second electrical connection structures to the first and second differential inputs, respectively, the capacitors serving as capacitively-coupled voltage sensors.

In another aspect, a sensor assembly for monitoring voltage drop across a fuse for blown-fuse detection is provided. The fuse has first and second fuse terminals and protects a circuit having first and second conductor portions, the fuse being electrically connected in series with the first and second conductor portions. The sensor assembly includes first and second electrical connection structures for electrically connecting the first and second conductor portions to the first and second fuse terminals, respectively; and first and second electrical insulator structures mechanically supporting the first and second electrical connection structures, respectively, each of the electrical insulator structures having a fuse end and a base end, a fuse-end terminal at the fuse end electrically connected to a respective one of the electrical connection structures, and a base-end terminal at the base end, the base-end terminals being outputs of the sensor assembly. Each of the electrical insulator structures includes a capacitor within the insulator structure, each capacitor capacitively coupling the fuse-end terminal to the base-end terminal.

DETAILED DESCRIPTION

In overview, in one embodiment of the invention electrical insulator structures that support the terminals of a fuse holder in a medium voltage application (voltage range 2,400 to 38,000 volts) contain capacitively-coupled voltage sensors. One sensor is connected to the electrical line side, and another to the electrical load side of a fuse being monitored for blown fuse detection.

Figure 1:
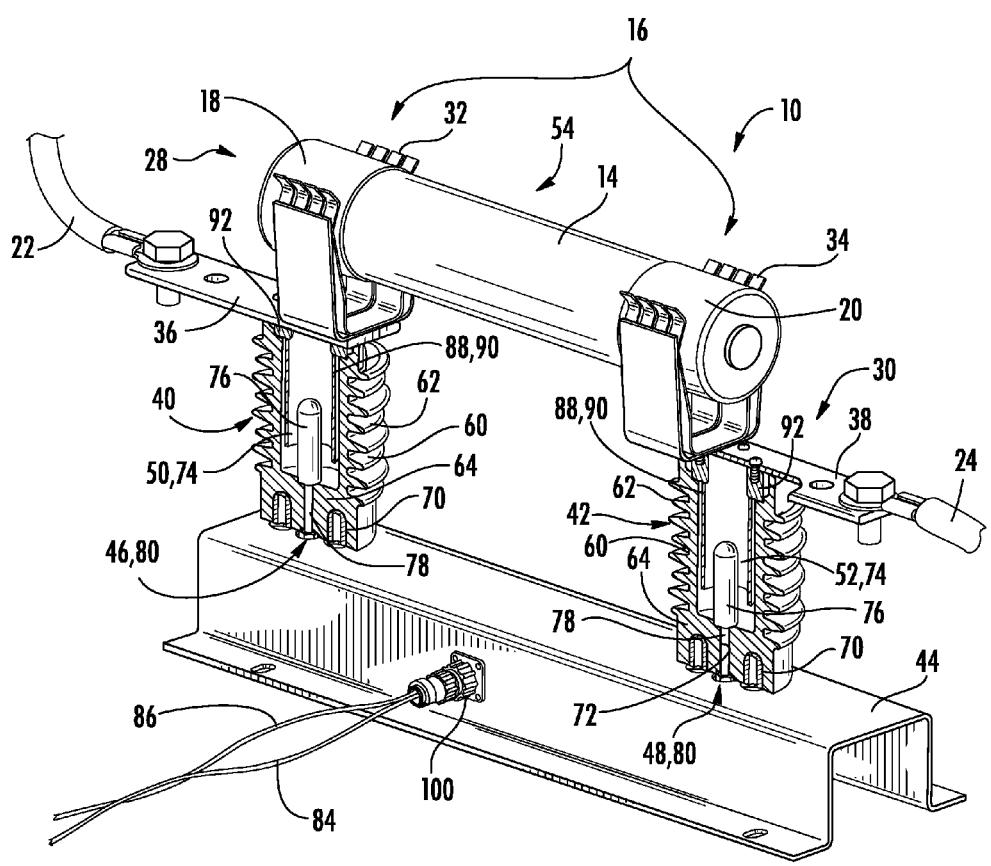
FIG. 1 is a three-dimensional view of the sensor portion of a blown fuse detector embodying the invention, with portions cut away for purposes of illustration.

Referring first to FIG. 1, a fuse/sensor assembly portion 10 of a blown fuse detector 12 (FIG. 3) includes a fuse 14 and a fuse holder generally designated 16. The fuse 14 is a medium-voltage fuse, operating within the approximate voltage range 2,400 to 38,000 volts. The fuse 14 is cylindrical, and has first and second fuse terminals 18 and 20.

The fuse 14 is for protecting a circuit represented by first and second conductor portions 22 and 24. Accordingly, the fuse 14 is electrically connected in series with the conductor portions 22 and 24. In a conventional manner, one of the conductor portions 22 and 24 is, for example, connected to the line side of a circuit, and the other of the conductor portions 22 and 24 is connected to the load side of the circuit.

The fuse holder 16 more particularly includes first and second electrical connection structures 28 and 30 for electrically connecting the first and second conductor portions 22 and 24 to the first and second fuse terminals 18 and 20, respectively.

The first and second electrical connection structures 28 and 30, which may also be viewed as terminal structures 28 and 30, include respective spring contacts 32 and 34 for electrical and mechanical connection with the fuse terminals 18 and 20, as well as respective connection terminals 36 and 38 to which the conductor portions 22 and 24 are connected.

The first and second electrical connection structures 28 and 30 are supported by respective electrical insulators 40 and 42, which are in turn mounted to a channel-like base 44.

As thus far described, the elements illustrated in FIG. 1 are conventional.

In the illustrated embodiment of the invention, rather than standard solid insulators, the insulators 40 and 42 more particularly are what are herein termed electrical insulator structures 40 and 42, or electrical insulator support structures 40 and 42. Each of the electrical insulator structures 40 and 42 has the external appearance of a conventional solid insulator, with the exception of included base-end electrical terminal structures 46 and 48 described hereinbelow.

Thus, the electrical insulator structures 40 and 42 differ from standard solid insulators in that the electrical insulator structures 40 and 42 contain respective capacitors, generally designated 50 and 52, which serve as capacitively- coupled voltage sensors 50 and 52. The electrical connection structures 28 and 30, and the electrical insulator structures 40 and 42 including the capacitors 50 and 52, form what is herein termed a sensor assembly 54.

Again, notwithstanding the inclusion of the capacitors 50 and 52 or capacitively-coupled voltage sensors 50 and 52, the electrical insulator structures 40 and 42 have the external appearance of standard solid insulators, with the exception the electrical terminal structures 46 and 48.

Figure 2:
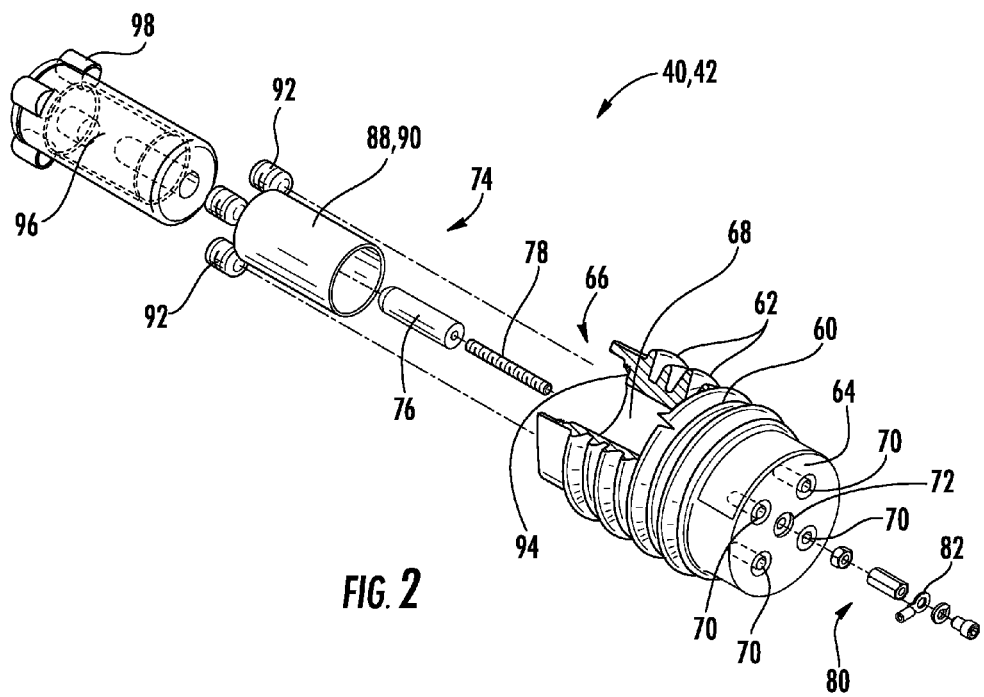
FIG. 2 is a three-dimensional exploded view of one of the sensors in the blown fuse detector of FIG. 1.

With reference to FIG. 2, in addition to FIG. 1, each of the electrical insulator structures 40 and 42 more particularly includes a generally cylindrical insulator body 60 made of epoxy and having external ribs 62 or corrugations 62. The insulator body 60 has a generally solid bottom 64 and an open top 66, with an internal cavity 68. (Conventional insulators are solid, without an internal cavity.) For mounting purposes, four threaded inserts 70 are molded into the bottom 64, which also has a central aperture 72 communicating into the cavity 68.

A capacitor 74 (corresponding to the capacitors 50 and 52) within the cavity 68 of the insulator body 60 includes a central electrode 76 axially extending along a central axis. The central electrode 76 is generally in the form of an aluminum rod with a rounded end, and is threaded at the bottom to receive a threaded rod 78 made of stainless steel which serves to secure the central electrode 76 against the bottom 64, as well as an electrical connector. Thus, the threaded rod 78 passes through the aperture 72, projecting out through the bottom 64, and connects to conventional terminal hardware 80, as shown in FIG. 2. The illustrated terminal hardware 80 is a more particular example of each of the base-end electrical terminal structures 46 and 48. A ring terminal 82 is provided for connection to a sensor signal wire 84 or 86.

The capacitor 74 additionally includes a hollow cylindrical outer electrode 88 in the form of an aluminum sleeve 90, sized so as to fit within the internal cavity 68 of the insulator body 60, and having mounting ears 92. The mounting ears 92, being electrically conducting and electrically connected to the outer electrode 88, serve as a fuse-end terminal 92 of the electrical insulator structure 40 or 42. The mounting ears 92 also serve as screw-receiving inserts and are received within mounting recesses 94 at the top of the insulator body 60. The mounting ears 92 are connected, mechanically and electrically, to the respective first and second electrical connection structures 28 and 30.

During assembly, the central electrode 76 is secured via the threaded rod 78. The outer electrode 88 with its aluminum sleeve 90 is inserted into the cavity 68, with the mounting ears 92 received in the recesses 94. The cavity 68 is then filled with an epoxy dielectric material shown in the exploded view of FIG. 2 as element 96. The epoxy dielectric material 96 as illustrated in FIG. 2 is generally a solid cylinder which is generally within the aluminum sleeve 90 of the outer electrode 88, except for space occupied by the central electrode 76. Projections 98 at the top of the epoxy dielectric material 96 are defined by space between the mounting ears 92 of the outer electrode 88 and the mounting recesses 94 of the insulator body 60.

Accordingly, a capacitor is formed having two electrodes 76 and 88 separated by the epoxy dielectric material 96. In other words, the solid dielectric material 96 is in between the electrodes 76 and 88. The capacitor couples an AC voltage from the respective electrical connection structure 28 or 30 to the terminal hardware 80 embodying the terminal structures 46 and 48. The sensor signal wires 84 and 86 or conductors 84 and 86 (FIGS. 1 and 3) are connected to the terminal hardware 80 of the respective voltage sensors 50 and 52, and pass through the base 44 via a connector 100 (FIG. 1).

Figure 3:
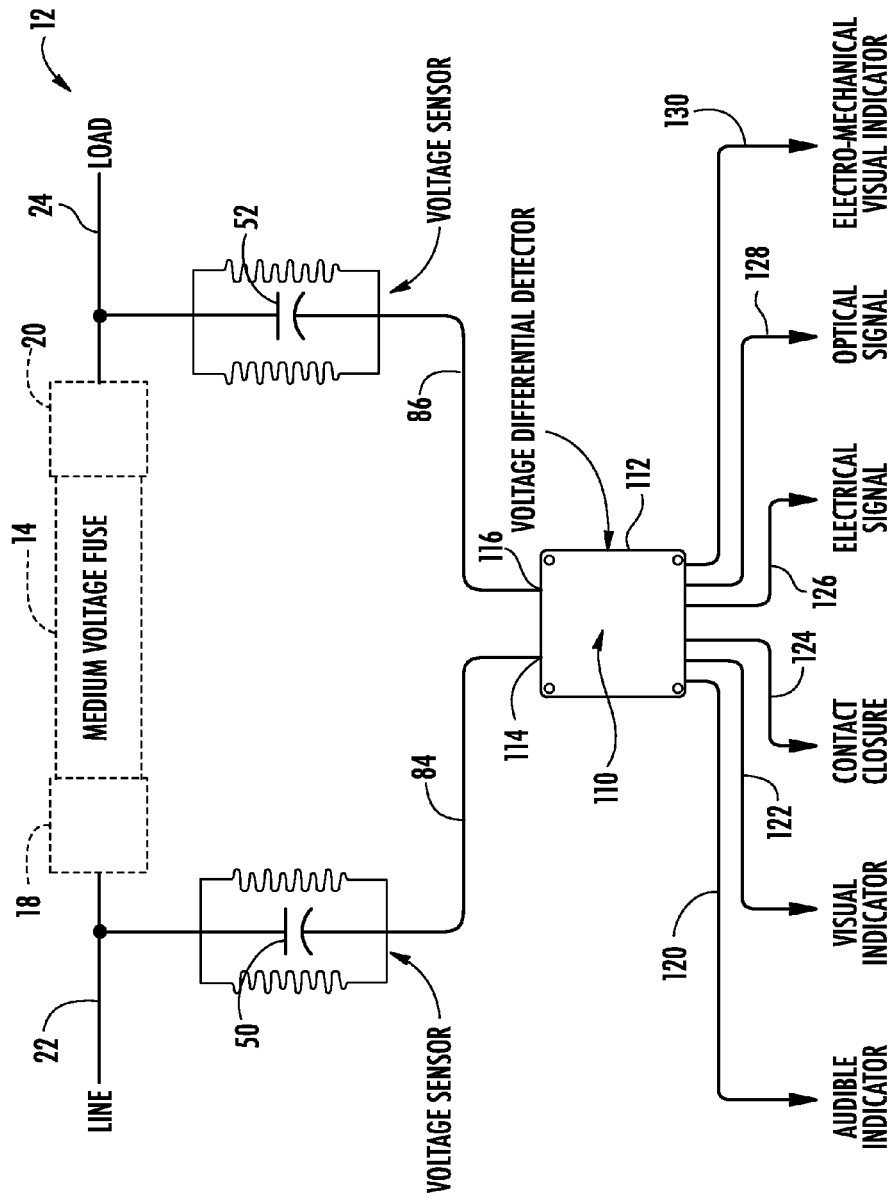
FIG. 3 is an electrical schematic diagram of the blown fuse detector embodying the invention.

With particular reference to FIG. 3, in addition to the fuse/sensor assembly portion 10 as illustrated in FIG. 1, the blown fuse detector 12 embodying the invention includes a detection circuit 110, more particularly a voltage differential detector 110, housed in a suitable enclosure 112. In a typical installation, the enclosure 112 is mounted remotely for operator fuse status observation. The voltage differential detector 110 has first and second differential inputs 114 and 116 to which the sensor signal wires 84 and 86 are electrically connected.

In FIG. 3, six exemplary and representative output signal lines are shown representing potential outputs of the voltage differential detector 110, signal lines 120, 122, 124, 126, 128 and 130. These represent typical ways information from the blown fuse detector 10 can be used to interface with the outside world.

Thus, the output of the sensors 50, 52 is connected to the detection circuit 110 that monitors the difference between the voltages outputted by the two sensors 50, 52. When the element in the fuse is intact and the fuse is operating properly (i.e. not "blown") the detection circuit 110 "sees" no difference between the two sensor output voltages (other than a small voltage drop which occurs during normal operation), and does not initiate any action. When the element in the fuse is open and the fuse is in an open or "blown" state the detection circuit "sees" a difference between the two sensor output voltages which exceeds a predetermined threshold voltage and initiates an action.

The term "action" as it relates to the detection circuit includes, but is not limited to, sounding an audible warning device, illuminating (continuous or flashing) a visual indicator, operating a mechanical visual indicator, closing a relay contact that can then be used to control an action outside the device, outputting an optical signal that can then be used to control an action outside the device, and/or outputting an electrical signal that can then be used to control an action outside the device. The robustness of these actions depends on how the detection circuit 110 is configured.

In one configuration the detection circuit 110 receives all its signals as well as control power from the sensors 50, 52, thus requiring no external control power source. In a second configuration the detection circuit 110 receives a signal voltage from the voltage sensors 50, 52 but is powered by an external control power source (not shown) allowing for more robust output responses.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A detector for monitoring voltage drop across a fuse for blown-fuse detection, the fuse having first and second fuse terminals and protecting a circuit having first and second conductor portions, the fuse being electrically connected in series with the first and second conductor portions, said blown-fuse detector comprising:

first and second electrical connection structures for electrically connecting the first and second conductor portions to the first and second fuse terminals, respectively;

a voltage differential detector having first and second differential inputs and which is operable to generate a detector output when the voltage across said differential inputs exceeds a predetermined threshold voltage;

first and second capacitors capacitively coupling said first and second electrical connection structures to said first and second differential inputs, respectively, said capacitors serving as capacitively-coupled voltage sensors;

said first and second capacitors being included within respective first and second electrical insulator structures mechanically supporting said first and second electrical connection structures; and said first and second electrical insulator structures being supported on a base through which electrical connections to said voltage differential detector circuit pass.

2. A sensor assembly for monitoring voltage drop across a fuse for blown-fuse detection, the fuse having first and second fuse terminals and protecting a circuit having first and second conductor portions, the fuse being electrically connected in series with the first and second conductor portions, said sensor assembly comprising:

first and second electrical connection structures for electrically connecting the first and second conductor portions to the first and second fuse terminals, respectively;

first and second electrical insulator structures mechanically supporting said first and second electrical connection structures, respectively, each of said electrical insulator structures having a fuse end and a base end, a fuse-end terminal at said fuse end electrically connected to a respective one of said electrical connection structures, and a base-end terminal at said base end, said base-end terminals being outputs of said sensor assembly; and each of said electrical insulator structures including a capacitor within said insulator structure, each capacitor capacitively coupling said fuse-end terminal to said base-end terminal;

said base ends of said first and second electrical insulator structures being supported on a base through which electrical connections to said base-end terminals pass.

3. The sensor assembly of claim 2, wherein said insulator structures each have the appearance of a conventional solid insulator, with the exception of the inclusion of said base-end terminals.

4. The sensor assembly of claim 2, wherein said capacitors are coaxial, including a central electrode axially extending along a central axis, and a hollow cylindrical outer electrode coaxial with and spaced from said central electrode.

5. The sensor assembly of claim 4, which further comprises a solid dielectric body in between said central electrode and said outer electrode of each capacitor.

6. The sensor assembly of claim 4, wherein said central electrode of each capacitor is electrically connected to said base-end terminal of the respective insulator structure, and said outer electrode of each capacitor is electrically connected to said fuse-end terminal of the respective insulator structure.

7. A detector for monitoring voltage drop across a fuse for blown-fuse detection, the fuse having first and second fuse terminals and protecting a circuit having first and second conductor portions, the fuse being electrically connected in series with the first and second conductor portions, said blown-fuse detector comprising:

first and second electrical connection structures for electrically connecting the first and second conductor portions to the first and second fuse terminals, respectively;

a voltage differential detector having first and second differential inputs and which is operable to generate a detector output when the voltage across said differential inputs exceeds a predetermined threshold voltage;

first and second capacitors capacitively coupling said first and second electrical connection structures to said first and second differential inputs, respectively, said capacitors serving as capacitively-coupled voltage sensors;

said first and second capacitors being included within respective first and second electrical insulator structures mechanically supporting said first and second electrical connection structures; and said first and second electrical insulator structures being supported on a base.

* * * * *